United States Patent [19]

Hamilton et al.

[11] 4,264,909
[45] Apr. 28, 1981

[54] FREQUENCY SEARCHING AND/OR JAMMING MEANS

[75] Inventors: Alan R. Hamilton; Robert D. Tollefson, both of Cedar Rapids, Iowa

[73] Assignee: Rockwell International Corporation, El Segundo, Calif.

[21] Appl. No.: 682,567

[22] Filed: Sep. 5, 1957

[51] Int. Cl.³ .............................................. G01S 7/38
[52] U.S. Cl. .................................................. 343/18 E
[58] Field of Search ........................ 250/17, 20.41 A; 343/18 E

[56] References Cited

U.S. PATENT DOCUMENTS

| | | | |
|---|---|---|---|
| 2,369,542 | 2/1945 | Dietrich | 334/22 |
| 2,537,944 | 1/1951 | Colgan | 455/166 |
| 2,640,150 | 5/1953 | Wu | 455/75 |
| 2,648,063 | 8/1953 | Schmitt | 455/77 |
| 2,885,543 | 5/1959 | Williams | 343/18 E |

Primary Examiner—Malcolm F. Hubler

Attorney, Agent, or Firm—Richard W. Anderson; Richard A. Bachand; Robert J. Crawford

EXEMPLARY CLAIM

1. Means for searching across a frequency band and instantly stopping at any received frequency, comprising a detector, means for heterodyning said received frequency being connected to said detector, variable oscillator means, means for periodically varying said oscillator over a range of frequencies, means for injecting the frequencies of said oscillator in discrete steps into said heterodyning means, a pulse generator, a pulse-blocking bistable gate means coupling the output of said pulse generator to said oscillator means, pulse-shaping means associated with said detector to instantly form a pulse upon reception of said any received frequency, and means connecting the output of said pulse-shaping means to said gate means to open it in response to pulses from said pulse-shaping means, whereby the frequency variation of said oscillator means is discontinued and it provides a particular frequency in response to the output of said pulse-shaping means.

11 Claims, 3 Drawing Figures

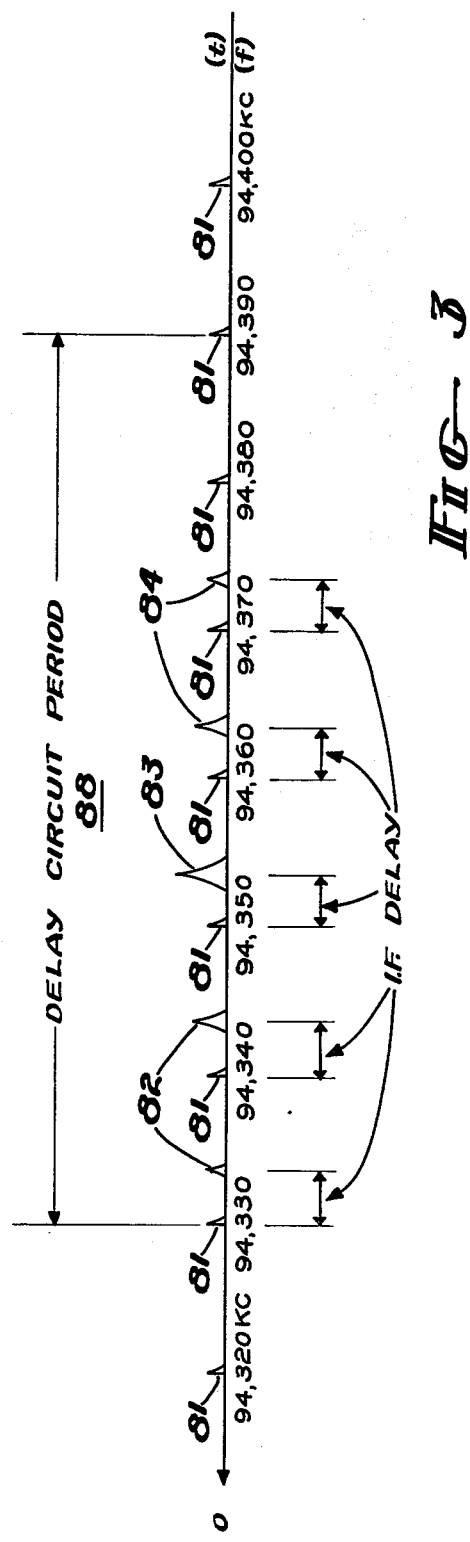

FREQUENCY SEARCHING AND/OR JAMMING MEANS

This invention relates generally to frequency scanning means capable of rapidly scanning across a broad-frequency range of receivable signals, instantly stopping at a received signal and transmitting a jamming signal on that frequency, while by-passing predetermined frequencies without transmitting a jamming signal.

The invention in a described embodiment provides a countermeasure system that can search across a large frequency band of receivable signals in a very rapid manner to determine if a radiated frequency exists. If a radiated frequency is detected, the system can immediately transmit a signal to jam it. Furthermore, the invention senses when the radiated frequency ceases or changes frequency, and accordingly ceases the jamming transmission or changes its frequency as required. When the radiated signal ceases, the invention immediately begins to search across the frequency range to sense any new radiated frequencies. Another important characteristic of the invention is that it can by-pass predetermined frequencies in its searching operation without affecting them.

The sweeping function of the invention is entirely electronic in nature and is done incrementally in small frequency steps. The sweep rate of the invention can be made very fast and can be either constant or variable, as desired.

The invention is utilized with multiconversion intermediate-frequency transmit-receive apparatus, wherein each converter stage has a stepping local oscillator system. The frequency-stepping sequence is controlled by a voltage-stepping circuit provided with each stepping oscillator. The voltage-stepping circuits are controlled by electronic counting circuits connected in tandem, with the first coupled to a pulse generator, which determines the stepping rate. The incremental-frequency step taken by the respective stepping oscillators increases as they are sequenced toward the antenna.

As the frequency-stepped heterodyning action of the receiver portion of the system passes over its range of frequencies, it may find a radiated frequency in use. As the system momentarily stops at the radiated frequency, it is detected and it generates a pulse which instantaneously stops the stepping action and triggers on the transmitter portion of the system to transmit a jamming frequency at the settings then obtained of the stepping oscillator to receive the enemy frequency. The invention periodically monitors the radiated signal in order to turn off the jamming transmission as soon as the radiated signal ceases.

However, not all received frequencies may be utilized by an enemy, but some may be friendly, in which case it is not desired for the system to stop and send out a jamming frequency. In order to do this the invention provides with each stepping oscillator a coincidence-matrix circuit having a switch with as many taps as there are stepped frequencies provided by its local oscillator. The respective taps of each switch are sequentially connected to its coincidence matrix circuit so that a pulse is provided to each tap corresponding to a different one of the stepped frequencies of the associated local oscillator. The poles of the tap switches are connected to inputs of another coincidence circuit, which provides an output when a particular heterodyning frequency is provided by the system which corresponds to the given friendly frequency. A plurality of bistable gates are used in the invention, which includes a receiver blocking gate at the receiver output which is opened by the coincidence circuit to prevent a pulse generated by a friendly received frequency from actuating the system to jamming operation.

Further objects, features and advantages of this invention will become apparent to a person skilled in the art upon further study of the specification and the accompanying drawings in which:

FIG. 3 shows waveforms used in explaining the operation of the invention.

Figure 1:
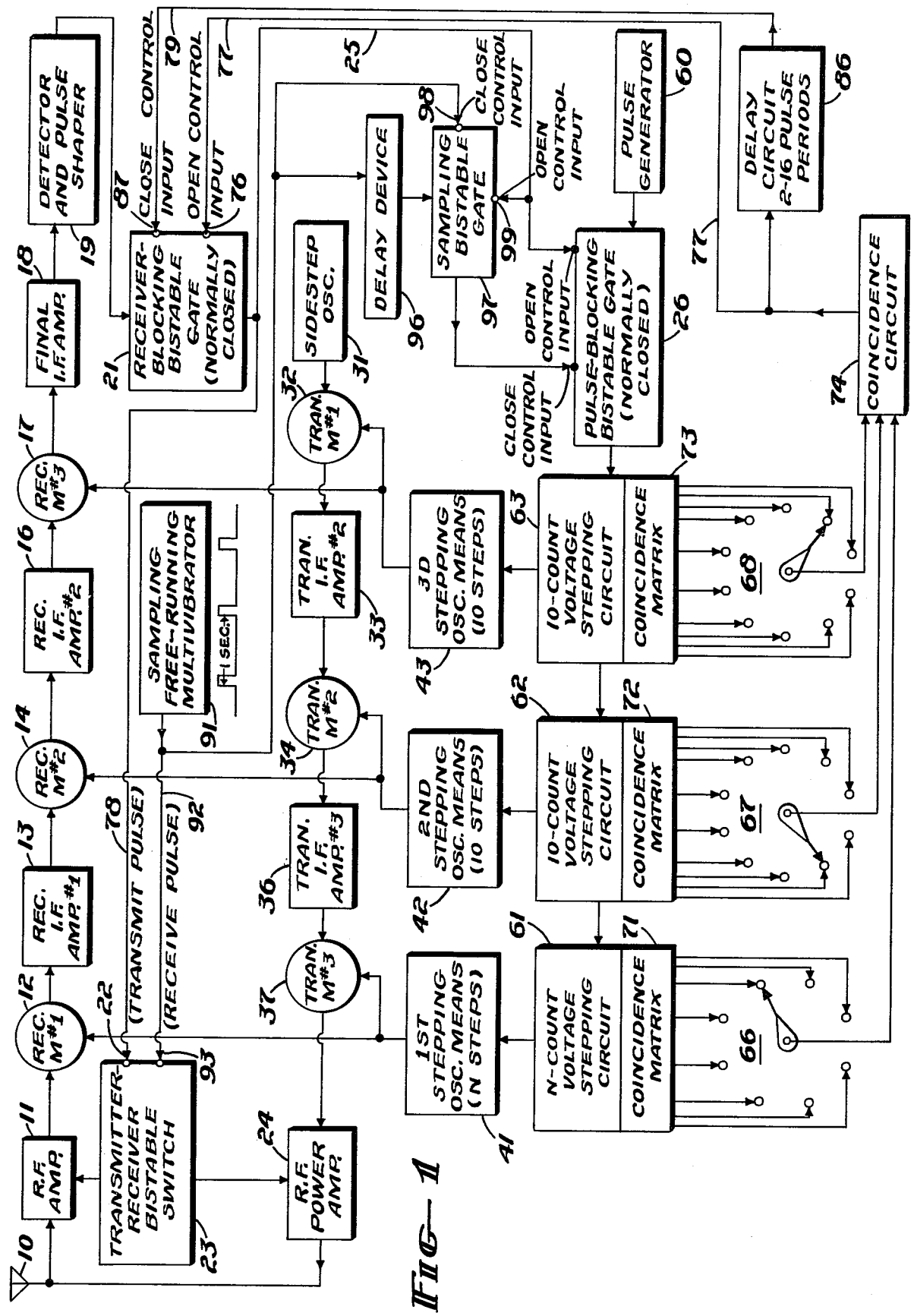
FIG. 1 is a diagrammatic representation of the invention.

Now referring to the drawings for a detailed description of an embodiment of the invention, an antenna 10 is used for both transmit and receive functions. A multiconverter receiver and transmitter is coupled to antenna 10. The receiver portion includes a radio-frequency amplifier 11 connected to antenna 10, a first frequency mixer 12 followed by an alternate tandem-connected arrangement of mixer 12, I.F. 13, mixer 14, I.F. 16, mixer 17, and final I.F. 18 as is conventionally found in multiconversion receivers. As many conversion stages may be used as required. R.F. amplifier 11 and all the intermediate-frequency amplifier shave fixed bandpasses, with the R.F. amplifier bandpass being the largest and the bandpasses decreasing in size and being dependent upon the range of heterodyning frequencies provided to their adjacent prior frequency mixer. Furthermore, the rapid rate of system operation makes mechanical tuning impossible; and accordingly, fixed bandpasses must be used.

A detector and pulse shaper 19 is connected to the output of final receiver I.F. amplifier 18 to provide a short duration pulse when a signal is received by antenna 10, which will be explained later.

The transmitter portion of the system is a similar multi-conversion system with the same number of mixer and I.F. stages as is found in the receiver portion. It utilizes a sidestep oscillator 31 which has a frequency equal to the tuned frequency of final I.F. amplifier 18. A sequence of alternately and tandemly connected frequency mixers and I.F. amplifiers follows sidestep oscillator 31, they being mixer 32, I.F. 33, mixer 34, I.F. 36, and mixer 37. The output of mixer 37 is connected to R.F. power amplifier 24, which provides its output to antenna 10.

A plurality of stepping local oscillators are provided, with a separate local oscillator output being provided as the input to one mixer in the transmitter portion and a corresponding mixer in the receiver portion of the system. These stepping local oscillators comprise first oscillator 41 which provides N number of stepped output frequencies to mixers 12 and 37, a second stepping oscillator 42 providing ten stepped output frequencies to mixers 14 and 34, and a third stepping oscillator 43 providing ten stepped output frequencies to mixers 17 and 32.

The stepping oscillators may be devised in many different ways. For example, each may include a number of crystals with means for sequentially connecting them to step the oscillator output frequency. However, a preferable way of making the stepped oscillators is by the stabilized variable oscillator arrangement shown in FIG. 2. This oscillator system selects its output frequencies by means of the amplitude of a stepped-voltage input wave such as waveform 44 in FIG. 2.

A voltage-summing circuit 46 receives stepped voltage 44 and passes it (with possible modification to be explained later) to a variable reactance 47, which accordingly steps the frequency of a stabilized oscillator 48. Thus, reactance 47 varies as a function of the input stepped voltage level. Variable reactance 47 can be a reactance-tube circuit or a saturable reactor connected to oscillator 48. Reactance tubes and saturable reactors have long been used to linearly vary the frequency of an oscillator. Thus, each constant voltage step of each cycle of input stepping voltage 44 selects a respective frequency output for its variable oscillator 48. This output is frequency multiplied by item 49 and is provided to its respective frequency mixers. The frequency of crystal oscillator 52 is chosen equal to the increment between stepped output frequencies from multiplier 49. However, sufficient frequency stability is generally not obtainable directly from the input stepped voltages, and a reasonably high degree of stability is required for the stepped output frequency of terminal 51. Stability is provided by comparing the stepped voltages to harmonics of a crystal oscillator 52. Thus, the steps of the input voltage merely select which crystal harmonic will be utilized for stabilizing comparison purposes for a given step. Since many of the lower and higher amplitude harmonics are not used, a harmonic band filter 53 is provided to select the range of crystal harmonics which are utilized. A particular harmonic is selected by the heterodyning action of mixer 54 and the tuning of a fixed discriminator 56. The output of discriminator 56 is determined only by the heterodyned harmonic falling in its bandpass.

Frequency discriminator 56 is tuned to the frequency difference between any precise frequency output of multiplier 51 and a selected harmonic. Then, the discriminator provides a null output when the stepping frequency precisely aligns with a crystal harmonic. If such alignment is not obtained, discriminator 56 provides a direct-current output voltage to voltage summing circuit 46 which alters the value of the output stepping voltage until a null output is provided by the discriminator. Thus, sufficient voltage stability is required for the input stepped voltage to select an oscillator frequency nearer to a desired harmonic than to any other harmonic, since the feedback loop will cause a frequency lock onto the nearest harmonic.

Figure 2:
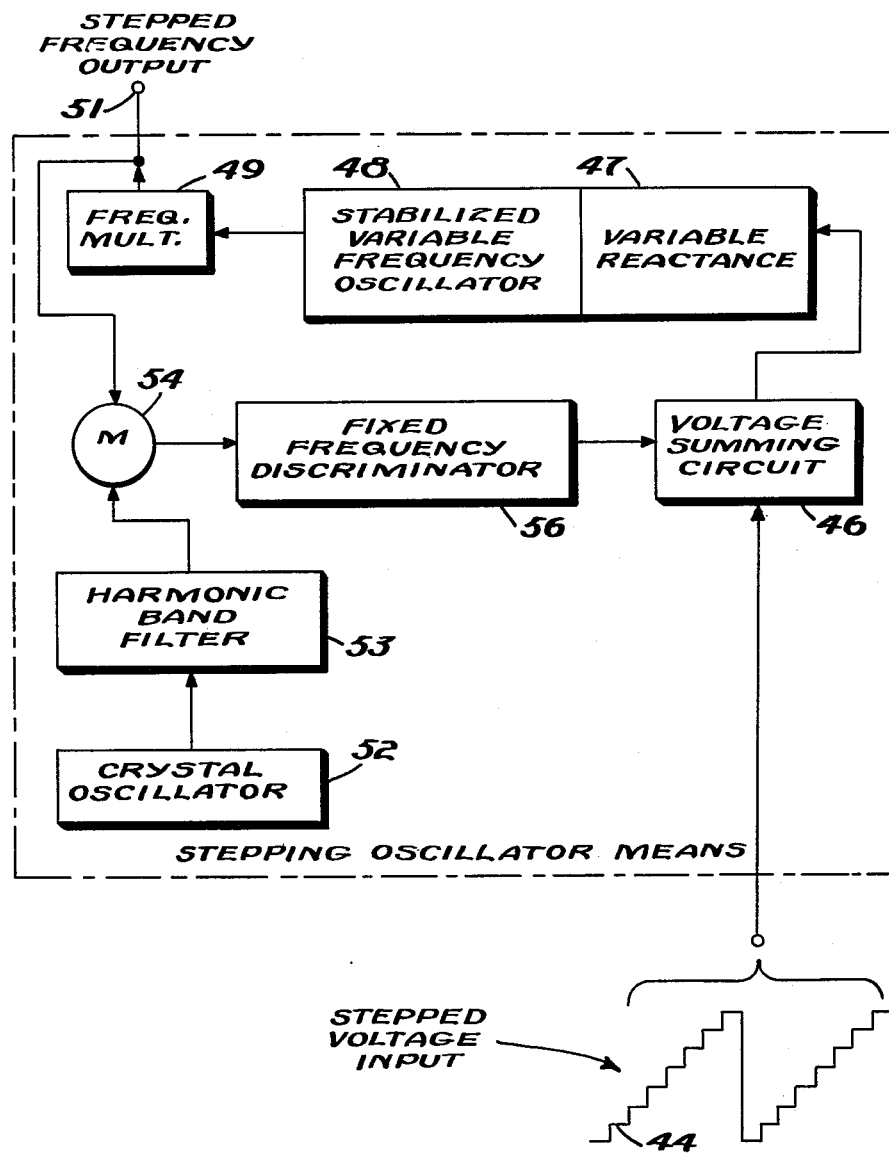
FIG. 2 illustrates a stepping local oscillator component.

The stepping oscillator means in FIG. 2 can be representative of each of the oscillator means 41, 42 and 43 in FIG. 1. The frequency step increases by an order of magnitude as the oscillator sequence progresses from 43, 42 to 41. The increased step can be obtained in either of two ways:

(1) by increasing the frequency of crystal oscillator 52, and/or (2) increasing the multiplication factor of frequency multiplier 49.

However, in the case of stepped output frequencies having low absolute value, sufficient stability can often be obtained without the feedback loop. Consequently, items 46, 52, 53, 54 and 56 can be eliminated.

A decade system for the frequency stepping operation is not basically essential to the system; however, it does simplify the work of an operator in selecting friendly frequencies not to be jammed by the system. Accordingly, each of the stepping oscillators except the first, oscillator 41, is provided with ten frequency steps to maintain a decade system. This requires that the stepped-voltage wave generated by the respective voltage-stepping circuits 61, 62 and 63 provide a voltage wave with steps equal in number to the frequency steps required of their associated oscillator. Thus, circuits 62 and 63 provide ten voltage steps-per-cycle, and circuit 61 provides N steps-per-cycle. Multivibrator-counter means can be used to generate the stepped voltages. A means for generating step voltage 44 is described and claimed in patent application, Ser. No. 611,977 to Robert D. Tollefson titled "Precision Step Voltage Generator". Briefly, the circuit in the latter application comprises a feedback control system for a binary counter arrangement to maintain uniformity of the output voltage steps.

Stepping circuits 61, 62 and 63 are connected in tandem and are operated in synchronism by means of a pulse generator 60 connected to stepping circuit 63 through a normally-closed gate 26. In count-down arrangement, circuit 62 makes one step for each cycle of ten steps by stepping circuit 63; and circuit 61 makes one step for each cycle of ten steps by circuit 62.

Gate 26 is normally closed to permit passage of the pulses and is only opened to cut off the pulse input when it is required to stop the stepping sequence in order to have the oscillator system remain at a given frequency position in the stepping sequence. Thus, the voltage-stepping circuit must be capable of retaining its voltage at a stopped point in its stepping sequence for an indefinite length of time.

Due to the synchronous frequency stepping of oscillator means 41, 42 and 43, it is apparent to one skilled in the art how the output of final I.F. amplifier 18 periodically senses across the frequency band received by antenna 10 by heterodyning sequential portions of the receivable range of antenna 10 into the I.F. passbands of the system. Multiconversion receivers are well known, such as the ARC-27, which use banks of crystals in a multichannel arrangement. Although the output of final I.F. 18 continuously sweeps across the scanned frequency range, it does not provide any output until a frequency is actually received by antenna 10. Then, I.F. 18 provides an output only during that portion of the scanning cycle that it senses the received frequency, which exists only when the stepping oscillators heterodyne it into the bandpasses of their respective I.F. amplifiers.

This output lasts only momentarily during the stepping sequence and has an introductory transient due to the stepping action of the oscillators. A detector 19, which can be a conventional amplitude detector, provides an output pulse from the transient I.F. output, which is sharpened by conventional pulse shaping means. This pulse is used to stop the stepping of the oscillator means before they can go to the next step and to switch on the transmitter portion of the system to send out a similar frequency for jamming. Oscillator stepping is immediately stopped by having the pulse provided from the output of bistable gate 21 through a lead 25 actuate the open control input of bistable gate 26 to stop the pulse of generator 60 from reaching the voltage-stepping circuits, thereby stopping the stepping action of the heterodyning oscillators and maintaining them at the frequency value which obtains the received frequency. Also, the detected pulse actuates the transmitter portion by passing down lead 78 to the transmit pulse input 22 of a bistable switch 23 which is triggered by the pulse to switch on a radio-frequency power amplifier 24 that transmits the same frequency as was received and can also turn off receiver amplifier 11. The pulse is then passed through a closed gate 21. Bistable switch 23 is basically a trigger circuit, and may be of the Eccles-Jordan type. It has a pair of control inputs, which are the transmit pulse input and the receive pulse input. Pulses received at the transmit input can only cause or maintain the switch in transmit condition. Similarly, pulses received at the receive input can only cause or maintain the switch in the receive condition. Thus, with an Eccles-Jordan circuit, the switch may be controlled by the voltage at the plate of one of its pair of tubes, with the transmit control input being to the grid of one tube for receiving positive pulses, and with the receive control input being to the cathode of the same tube for receiving negative pulses.

The system also includes several bistable gates, such as gates 21, 26 and 97, which are basically the same as switch 23, with a pair of opposite control inputs. Pulses provided to the open-control input cause or maintain the bistable gate in an open state preventing a signal from passing through it. Pulses provided to its close-control input cause or maintain the bistable gate in a closed state allowing a signal to pass through it.

Whenever an enemy frequency is sensed and power amplifier 24 is triggered to provide a jamming frequency, means must be provided for sensing when the enemy frequency ceases, in order to stop the jamming transmission which thereafter is useless. Efficiency, therefore, requires that the receiver portion of the system again begin scanning the frequency band so that it can inform the transmitter portion of another frequency to be jammed. This is done in the invention by having a sampling free-running multivibrator 91 provide short duration sampling pulses at relatively long intervals such as one second, wherein the sampling pulses switch the system momentarily back to receive without changing the step tuning of the system, in order to sense whether the enemy frequency still exists. Multivibrator 91 has its output connected by lead 92 to the receive pulse input 93 of bistable circuit 23. The pulse received at input 93 switches the bistable circuit to turn off the transmitter and turn on the receiver. If the enemy frequency remains, the receiver portion of the system immediately detects it and provides a new pulse through gate 21 and lead 78 to transmit pulse input 22 to retrigger the system back to the transmission state.

In order to prevent the tuned frequency of the system from being changed during intermediate sampling of the enemy transmission, means is provided to maintain bistable gate 26 open during the sampling process as long as the enemy transmission exists. This is done by having a time delay device 96 with its input connected to the output of multivibrator 91. A sampling bistable gate 97 has its signal input connected to the output of delay line 96. Furthermore, bistable gate 97 has a pair of control inputs, which include a close-control input 98 and an open-control input 99 of the type generally described above for a bistable gate. Close-control input 98 is connected to the input of delay line 96 and by-passes the delay line. Open-control input 99 is connected to the output of bistable gate 21. Thus, whenever multivibrator 91 provides a sampling pulse, it is received at control input 98 to close bistable gate 97. If the enemy transmission is still in existence, a pulse is provided very shortly thereafter by the receiver and is provided through gate 21 and lead 25 to open-control input 99 to open gate 97. Hence, when the delayed sampling pulse reaches gate 97, it finds the gate open and, therefore, cannot reach bistable gate 25 to affect it. Therefore, gate 26 remains open to continue to block any pulses to stepping circuit 63, and the oscillators retain their settings. Note that any output pulses from gate 21 resulting from the momentary operation of the receiver due to the sampling pulses is also received by the open-control input of gate 26, and, therefore, gate 26 is maintained open and unaffected.

However, if the enemy transmission has ceased, there will be no pulsed output provided from the receiver to trigger open gate 97. Therefore, it remains closed. Shortly thereafter the delayed sampling pulse is received by the now closed gate 97, which passes the pulse to the close-control input of gate 26. Thus, gate 26 closes and permits a reassumption of the pulses to stepping circuit 63 to resume the receiver frequency scanning.

With the system thus far described, no provision is made to distinguish between friendly and enemy frequencies. Therefore, it will jam a friendly frequency in the same manner as an enemy frequency. The following described portion of the system permits one or more known friendly frequencies to be by-passed without jamming during the scanning processes, but with jamming provided to any other frequencies found within the frequency range of the system.

A plurality of tap switches 66, 67 and 68 are respectively associated with stepping circuits 61, 62 and 63. Each tap switch has at least a single pole and a number of sequential contacts at least equal in number to the number of steps per cycle of its associated stepping circuit. Thus, switches 67 and 68 each have ten stator contacts, and switch 66 has N number of contacts, wherein N is eight in FIG. 1.

The stator contacts of each tap switch sequentially receive pulses. Thus, a given contact receives a pulse corresponding to a given step in the stepping cycle of its associated stepping circuit; and each pulse has a duration equal to the duration of its associated frequency step. Accordingly, the duration of each pulse from the poles of switches 67 and 66 is ten times and 10N times, respectively, the duration of any pulse from the pole of switch 68. This is done by connecting the respective stator taps to the associated stepping circuit by means of a coincidence matrix, represented by matrixes 71, 72 and 73, respectively. Each matrix consists of a plurality of conventional coincidence circuits (often called "and" circuits) equal to the number of steps-per-cycle of its associated stepping circuit. The inputs to the coincidence circuits in a respective matrix are connected to the trigger circuits of the associated stepping circuit in a well-known binary combination to obtain binary-to-decade and binary-to-N decoding. Such coincidence matrix circuits are well known and are often constructed of diodes because of their small size and simplicity. Also, the indicating counter technique can be used, such as taught in U.S. Pat. No. 2,540,442 to Grosdoff; wherein the taps of a wafer switch are connected in place of the indicating lights.

The setting of any given tap switch thus provides a pulse to its pole only when a given frequency step is being initiated by its associated oscillator means. Hence, the combined settings of the tap switches provide a simultaneous set of output pulses from the respective switch poles and correspond to a given single combination of heterodyning frequencies, which will heterodyne a small band of antenna-received frequencies into I.F. passbands of the receiver. A coincidence circuit 74 has plural inputs respectively connected to the poles of tap switches 66, 67 and 68. Thus, coincidence circuit 74 provides an output pulse at the instant the receiver is set to receive the given input frequency selected by the settings of the tap switches. Such output pulse from coincidence circuit 74 is utilized to disable the transmitter portion of the system until the receiver system sweeps beyond the frequency setting of tap switches 66, 67 and 68. By disabling the transmitter during this portion of the scanning sequence, the system cannot send out a jamming frequency corresponding to the frequency setting of the tap switches. Transmitter disabling is done by connecting the output of coincidence circuit 74 by a lead 77 to the open control input 76 of receiver-blocking bistable gate 21 to trigger open gate 21 and prevent any receiver output from triggering on the transmitter. Due to a small amount of delay in the I.F. filters of the system, the pulsed output of detector 19 caused by friendly frequency occurs after gate 21 is opened and, therefore, is blocked and cannot trigger transmit pulse control 22 of bistable circuit 23. Accordingly, the transmitter power amplifier 24 remains off and no jamming signal is transmitted.

However, due to the substantial bandwidth generally necessary in the receiver system and where the stepped frequencies are closely spaced, a given frequency provided to the atenna may cause several adjacent pulsed outputs from the receiver. This occurs because several adjacent frequency steps heterodyne the frequency into different portions of the I.F. passbands. Thus, receiver pulses may be provided for adjacent frequency steps both before and after the center stepping-frequency, which heterodynes the incoming frequency into the mid portion of the I.F. passbands. However, the center step provides maximum amplitude. Thus, a friendly frequency will cause several adjacent output pulse, and it is imperative that none of them trigger on the jamming transmitter portion of the system. FIG. 3 illustrates a sequence of pulses 82, 83 and 84 caused by a received frequency. These pulses are shown in relation to pulses 81 provided by pulse generator 60 which time the system. The frequency steps occur in synchronism and in sequence with generator pulses 81 which correspond to ten-kilocycle intervals, for example. Each of the pulses 82, 83 and 84 is generated by the leading edge of its heterodyning frequency step but is delayed at the receiver output by the I.F. passbands. The final I.F. has the narrowest passband and is most responsible for the delay. If it is assumed in an example that a friendly frequency exists near the 94,350 kilocycle step in FIG. 3, it will provide a maximum pulse output 83 from the receiver pulse shaper 19. However, some frequency steps before 94,350 kilocycles (such as 94,330 and 94,340 kilocycles) and some frequency steps after 94,350 kilocycles (such as 94,360 and 94,370 kilocycles) cause other smaller amplitude pulses 82 and 84. They are smaller because they fall away from the center of the I.F. bandpasses and are attenuated to varying degrees. However, any of pulses 82, 83 and 84 are assumed sufficient to trigger on the transmitter, and, therefore, all must be blocked by gate 21. This is done by opening bistable gate 21 for the period of time of the friendly output-pulse sequence. Furthermore, gate 21 must be opened prior to the reception of the first pulse 82. The pulse provided from the output of coincidence circuit 74 is used to open gate 21. Therefore, tap switches 66, 67 and 68 must be set to indicate a frequency prior to the given friendly frequency by an amount depending on the I.F. bandwidth of the system. This is done primarily by the setting of switch 68, since its setting corresponds to respective frequency steps. Each setting of switch 67 corresponds to ten frequency steps. Hence, in this example, switch 68 has its pole set back two steps, so that a coincidence circuit output pulse occurs 20 kilocycles before the friendly frequency is reached. Consequently, the coincident circuit pulse passes through lead 77 to the open-control input 76 of receiver-blocking bistable gate 21.

Hence, at 94,330 kilocycles, bistable gate 21 is opened, thus preventing any of the pulses 82, 83 or 84 from triggering the transmitter.

However, it is necessary that bistable gate 21 be reclosed as soon as the friendly pulse sequence ends, in order to resume the scanning of enemy frequencies. This is done by means of delay circuit 86, which has its input connected to the output of coincidence circuit 74. The output of delay circuit 86 is connected by lead 79 to the close-control input 87 of bistable circuit 21. Delay circuit 86 can be any type of delay circuit which provides a delay for a time interval corresponding to the period during which pulses 82, 83 and 84 are provided. This is illustrated as delay-circuit period 88 in FIG. 3. A preferable form of delay circuit 86 is a counter-type delay circuit, which is well known in the art. It provides a delay of an integral number of pulse periods of a timing source which can be generator 60. The delay time interval 88 in FIG. 3 presumes a delay of six pulse counts. When the output pulse is provided from delay circuit 86 to the close-control input 87 of gate 21, it is reclosed and again is capable of passing any receiver output pulse which may be received except that it is re-opened for the same period the next time the receiver scans over the frequency band.

The delay caused by the intermediate-frequency bandwidth should be less than the pulse period from generator 60, because if the delay period is greater, the oscillator system will step to the next higher frequency before it is stopped. Therefore, the maximum scanning rate of the system is dependent upon the I.F. passbands, particularly the last which is narrowest; the wider the passband, the faster the scanning rate, but also the more channels that must be blanked out due to a by-passed friendly frequency.

Although for simplicity the circuitry illustrated in FIG. 1 provides means for by-passng a single predetermined friendly frequency, it will be apparent that any number of predetermined frequencies may be by-passed. For each additional by-passed frequency, an additional set of tap switches (not shown) is provided that are respectively connected in parallel with the illustrated switches. Also, an additional coincidence circuit is provided which has its inputs connected to the oles of its additional set of tap switches. The output of such additional coincidence circuit is likewise connected to the input of delay circuit 86 and to lead 77.

It will be obvious that many modifications can be made in the described embodiment without departing from the scope of the invention. For example, a two-way intermediate-frequency amplifier system of known type can be used wherein the same mixers and I.F. amplifiers are used for both transmit and receive functions. Furthermore, separate antennas can be used for respective transmit and receive functions, or plural antennas can be used for each in order to obtain very broad band operation. Similarly, many R.F. amplifiers can be connected in parallel in order to obtain broader band operation for the system than can be obtained by a single amplifier. Although only three heterodyning stages are illustrated for the respective receiver and transmitter, it is obvious that as many frequency conversion stages may be used as desired.

Although this invention has been described with respect to a particular embodiment thereof, it is not to be so limited as changes and modifications may be made therein which are within the full intended scope of the invention as defined by the appended claims.

What is claimed is:

1. Means for searching across a frequency band and instantly stopping at any received frequency, comprising a detector, means for heterodyning said received frequency being connected to said detector, variable oscillator means, means for periodically varying said oscillator over range of frequencies, means for injecting the frequencies of said oscillator in discrete steps into said heterodyning means, a pulse generator, a pulse-blocking bistable gate means coupling the output of said pulse generator to said oscillator means, pulse-shaping means associated with said detector to instantly form a pulse upon reception of said any received frequency, and means connecting the output of said pulse-shaping means to said gate means to open it in response to pulses from said pulse-shaping means, whereby the frequency variation of said oscillator means is discontinued and it provides a particular frequency in response to the output of said pulse-shaping means.

2. Means for searching across a frequency band and instantly stopping at any received frequency and reviving the searching operation when the received frequency ends, comprising a detector, means for heterodyning said received frequency being connected to said detector, variable oscillator means, means for periodically frequency stepping said oscillator over a range of frequencies means for injecting the frequencies of said oscillator into said heterodyning means, a pulse generator, a pulse-blocking bistable gate means coupling the output of said pulse generator to said oscillator means, pulse-shaping means associated with said detector to instantly form a pulse upon reception of said any received frequency, and means connecting the output of said pulse-shaping means to said pulse-blocking gate means to open it in response to said pulse from said pulse-shaping means thereby stopping the frequency stepping of said oscillator at a particular frequency, a free-running pulse generator, with a sampling period being provided by the period of its pulsed output, a sampling bistable gate having open- and close-control inputs, with its close-control input connected to the output of said free-running pulse generator, and its open-control input connected to said pulse-shaping means, a time-delay device connected between the output of said free-running pulse generator and said sampling bistable gate, the output of said bistable gate being connected to the close-control input of said pulse-blocking bistable gate.

3. Receiver and transmitter means for scanning across a frequency band and instantly stopping at any received frequency and providing a transmission at said frequency, comprising a multi-stage conversion and intermediate-frequency system for said receiver and transmitter means, a plurality of frequency stepping oscillators being respectively coupled to the multi-conversion system, a plurality of voltage-stepping means, each providing periodically stepped voltages, and each having its output respectively connected to one of said stepping oscillators to step its frequency, said voltage-stepping means being connected in tandem with each other, a pulse source to control the voltage-stepping means and the resulting frequency stepping of said oscillators, a pulse-blocking bistable gate being connected between said pulse source and one of said voltage-stepping means, said bistable gate having an open-control input and a close-control input, means connecting said open-control input to the output of said receiver, wherein said receiver output triggers said pulse-blocking gate open to stop the output of said pulse source from reaching said voltage-stepping means thereby stopping the oscillators at a particular frequency combination, a pulse-actuable transmit-receive bistable switch having a transmit control input and a receive-control input which respectively control the operation of said receiver and transmitter means, and means connecting said transmit control input to the output of said receiver wherein the receiver output triggers said switch to turn on the output of said transmitter means.

4. Receiver and transmitter means as defined in Claim 3 including a sampling pulse generator for providing periodic sampling pulses to switch the system to receive condition, and means coupling the output of said sampling generator to the receive-control input of said transmit-receive bistable switch, said sampling pulse generator periodically recycling the system to resense the existence of a particular signal.

5. Receiver and transmitter means as defined in Claim 3 including a sampling pulse generator for providing periodic sampling pulses, means connecting the output of said sampling generator to the receive-control input of said transmit-receive bistable switch to switch the system to receive condition in response to a sampling pulse, delay means coupling the output of said sampling pulse generator to the close-control input of said pulse-blocking bistable gate, and means for immediately opening said pulse-blocking gate by said receiver output whereby the oscillators are not recycled during a sampling interval.

6. Receiver and transmitter means as defined in Claim 4, including a delay line having its input coupled to the output of said sampling pulse generator, a sampling bistable gate being connected to the output of said delay line, said bistable gate having an open-control input and a close-control input, means connecting said close-control input to the output of said sampling-pulse generator, and means connecting said open-control input to the output of said receiver having a frequency equal to the tuned frequency of the last intermediate-frequency amplifier.

7. A system as defined in claim 3 having means for preventing transmitter actuation by a given receivable frequency, comprising a plurality of single-pole multi-contact switches, with at least one switch being associated with each voltage-stepping means, the multi-contacts of each switch being at least equal in number to the steps-per-cycle provided by its associated voltage-stepping means, a plurality of sequential pulse-step selection means, with each of said pulse selection means connecting each of said voltage-stepping means, to respective multi-contacts of its associated single-pole switch, wherein the multi-contacts of each switch receive pulses in synchronism with the voltage stepping of its associated voltage-stepping means, a coincidence circuit having plural inputs respectively connected to the poles of said switches, a receiver-blocking bistable gate serially connected to the output of said receiver, said receiver-blocking bistable gate having a close-control input and an open-control input, and its open-control input being connected to the output of said coincidence circuit.

8. A system as defined in claim 7 including a delay circuit coupled between the output of said coincidence circuit and the close-control input of said receiver-blocking bistable gate.

9. A system as defined in claim 6 having means for preventing transmitter actuation by a given received frequency, comprising a plurality of coincidence matrices, each being associated with a different one of said voltage-stepping means, each of said voltage-stepping means except the last providing ten steps per cycle, a plurality of tap switches respectively associated with said voltage-stepping means, each of said tap switches having at least one pole and a plurality of stator contacts at least equal in number to the steps-per-cycle of its associated voltage-stepping means, the stator contacts of each switch being respectively connected to its associated coincidence matrix, wherein the associated coincidence matrix circuit sequentially provides pulses to its associated tap switch stator contacts in synchronism with the stepping of the output of its associated voltage-stepping circuit, a coincidence circuit having plural inputs respectively connected to the poles of said tap switches that are respectively associated with a different one of said voltage-stepping means, a pulse shaper coupled to the detected receiver output, a receiver-blocking bistable gate coupled to the output of said pulse shaper, the output of said receiver-blocking bistable gate being coupled to the transmit-control input of said transmit-receive bistable circuit and to the open-control input of said pulse-blocking bistable gate, and to the close-control input of said sampling bistable gate, the output of said coincidence circuit coupled to the open-control input of said receiver-blocking bistable gate, and a delay circuit connected between the output of said coincidence circuit and the close-control input of said receiver-blocking bistable gate.

10. A receiver-transmitter system for scanning across a band of frequencies and instantly stopping at any received frequency and providing a transmission at said frequency, comprising antenna means for transmitting and receiving signals for said system; the receiver portion of said system including a receiver radio-frequency amplifier connected to said antenna means, a plurality of receiver mixers, each having a pair of inputs, and a pluraliy of intermediate-frequency amplifiers, with one of said mixer inputs being coupled to the output of said radio-frequency amplifier, and with said intermediate-frequency amplifiers except the last being respectively connected between an output of one of said mixers and one of the inputs of the following of said mixers, a detector and pulse shaper, the last of said intermediate-frequency amplifiers being connected between the output of said last receiver mixer and said detector; said transmitter portion including a transmitter radio-frequency power amplifier connected to said antenna means, the same plurality of radio-frequency mixers and intermediate-frequency amplifiers as provided in said receiver portion, they being connected in tandem in the same manner as in said receiver portion but in reverse order to the input of said transmitter radio-frequency power amplifier and an oscillator having a frequency equal to the tuned frequency of the last intermediate-frequency amplifier being connected to the remaining mixer input; a transmit-receive bistable switching means for alternately switching on and off said receiver radio frequency amplifier and said transmitter power amplifier, said transmit-receive bistable switching means having a transmit-control input and a receive-control input; a receiver-blocking bistable gate connected between said pulse shaper and the transmit-control input of said transmit-receiver bistable switching means, said receiver-blocking bistable gate having a close-control input and an open-control input, a plurality of stepping-oscillator means, with the output of each stepping-oscillator means being coupled simultaneously to one of said receiver mixers and a corresponding one of said transmitter mixers, the first stepping-oscillator means associated with the frequency mixers connected to said radio-frequency amplifiers periodically providing N steps-per-cycle, the remaining stepping-oscillator means providing ten steps-per-cycle, a plurality of voltage-stepping circuits having their outputs respectively connected to said stepping-oscillator means, each of said voltage-stepping circuits having the same number of steps-per-cycle as its stepping-oscillator means and controlling its oscillator means, a pulse source, a pulse-blocking bistable gate coupled between said pulse souce and one of said voltage-stepping circuits, with it being connected in tandem with the other voltage-stepping circuits, said pulse-blocking bistable gate having an open-control input and a close-control input, with its open-control input being connected to the output of said receiver-blocking bistable gate, a sampling free-running multivibrator having its output connected to the receive-control input of said transmit-receive bistable switching means, a delay device having its output connected to said sampling multivibrator, a sampling bistable gate connected between the output of said delay device and the close-control input of said pulse-blocking bistable gate, said sampling gate having close- and open-control inputs, with its close-control input being connected to the output of said sampling multivibrator, and the open-control input of said sampling bistable gate being connected to the output of said receiver-blocking bistable gate.

11. A system as defined in claim 10 including a plurality of tap switches, with at least one of said tap switches being associated with one of said voltage-stepping circuits, each tap switch having a number of stator contacts at least equal to the number of steps-per-cycle of its associated stepping circuit, a plurality of coincidence matrices respectively associated with said voltage-stepping circuits and tap switches, each of said coincidence matrices providing sequential pulses to the contacts of its associated tap switch, with one sequential pulse being provided per step of its voltage-stepping circuit, a coincidence circuit having inputs connected to poles of respective tap switches, the output of said coincidence circuit being connected to the open-control input of said receiver-blocking bistable gate, and a delay circuit being connected between the output of said coincidence circuit and the close-control input of said receiver-blocking bistable gate.

* * * * *